United States Patent
Becht et al.

(10) Patent No.: US 11,244,096 B2
(45) Date of Patent: Feb. 8, 2022

(54) SIMULATING OPERATION OF AN ELECTRONIC DEVICE TRACING USING PORT MIRRORING

(71) Applicant: INTERNATIONAL BUSINESS MACHINES CORPORATION, Armonk, NY (US)

(72) Inventors: Michael James Becht, Poughkeepsie, NY (US); Christopher J. Colonna, Ossining, NY (US); Stephen Robert Guendert, Poughkeepsie, NY (US); Pasquale A. Catalano, Wallkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/861,255

(22) Filed: Apr. 29, 2020

(65) Prior Publication Data
US 2021/0342510 A1    Nov. 4, 2021

(51) Int. Cl.
*G06F 30/30* (2020.01)
*G06F 30/3308* (2020.01)
*G06F 115/06* (2020.01)

(52) U.S. Cl.
CPC ...... *G06F 30/3308* (2020.01); *G06F 2115/06* (2020.01)

(58) Field of Classification Search
CPC ....... G06F 11/261; G06F 30/33; G06F 11/263
USPC ........................................................ 716/136
See application file for complete search history.

(56) References Cited

U.S. PATENT DOCUMENTS

| | | | | |
|---|---|---|---|---|
| 4,644,487 A | * | 2/1987 | Smith | G06F 30/33 703/14 |
| 5,177,440 A | * | 1/1993 | Walker, III | G01R 31/31937 714/736 |
| 5,883,809 A | * | 3/1999 | Sullivan | G06F 30/33 716/103 |

(Continued)

FOREIGN PATENT DOCUMENTS

| | | |
|---|---|---|
| EP | 1600865 A1 | 11/2005 |
| JP | 06600011 B2 | 10/2019 |
| WO | 2015181389 A2 | 12/2015 |

OTHER PUBLICATIONS

Becht, Michael James et al. "Emulation Latch To Capture State" U.S. Appl. No. 16/773,002, filed Jan. 27, 2020.

(Continued)

*Primary Examiner* — Jack Chiang
*Assistant Examiner* — Brandon Bowers
(74) *Attorney, Agent, or Firm* — Cantor Colburn LLP; Steven Chiu

(57) ABSTRACT

Embodiments include simulating a design under test on an electronic device. Aspects include running a test program on the design under test and capturing inputs into the design under test. Aspects also include storing the inputs into the design under test in a storage device. Responsive to determining that an event has occurred during execution of the test program, aspects include halting the test program on the design under test. Aspects further include enabling a user via a user interface to determine a cause of the event by performing a simulation of the design under test using the inputs stored in the storage device.

20 Claims, 4 Drawing Sheets

(56) References Cited

U.S. PATENT DOCUMENTS

| | | | | |
|---|---|---|---|---|
| 7,826,282 B2 * | 11/2010 | Schmitt | ............... | G11C 7/10 |
| | | | | 365/189.17 |
| 7,930,162 B1 * | 4/2011 | Chan | ............... | G06F 30/331 |
| | | | | 703/14 |
| 7,930,165 B2 | 4/2011 | Weiss et al. | | |
| 2013/0116976 A1 | 5/2013 | Kanemasa et al. | | |
| 2017/0269136 A1 | 9/2017 | Ye et al. | | |

OTHER PUBLICATIONS

Cheng, X., et al., "A Run-Time RTL Debugging Methodology for FPGA-based Co-Simulation," 2010 International Conference on Communications, Circuits and Systems (ICCAS), IEEE, 2010; pp. 891-895.

IBM "List of IBM Patents or Patent Applications Treated as Related"; Date Filed: Apr. 29, 2020, 2 pages.

* cited by examiner

SIMULATING OPERATION OF AN ELECTRONIC DEVICE TRACING USING PORT MIRRORING

BACKGROUND

The present invention relates generally to the field of simulating an electronic device, and more particularly to using port mirroring to enable tracing the operation of a design under test for simulation.

In integrated circuit design, hardware emulation is the process of debugging and functional verification of the system under development. The emulation model is usually based on a hardware description language (e.g., Verilog) source code, which is compiled into the format used by the emulation system. Comprehensive hardware functional verification is critical to reduce development cost and time-to-market. Emulation provides quick bring-up and quick turn-around time when processing design changes. Also, emulation provides high design accessibility and debug visibility so that designers of application-specific integrated circuits (ASICs) can catch potential hardware failures before the tape out.

SUMMARY

Embodiments of the present invention disclose a method, a computer program product, and a system for simulating a design under test on an electronic device. Aspects include running, by one or more computer processors, a test program on a design under test and capturing inputs into the design under test. Aspects also include storing the inputs into the design under test in a storage device and halting, by the one or more computer processors, the test program on the copy responsive to determining that an event has occurred on the design under test. Aspects further include enabling, by the one or more computer processors, a user via a user interface to determine a cause of the event by performing a simulation of the design under test using the inputs stored in the storage device.

DETAILED DESCRIPTION

In the design of ASICs, respins and steppings are due at least in part to functional errors and bugs inadvertently introduced at the register-transfer level (RTL) stage of the design process. In addition, as software complexity and cost are drastically increasing, early hardware verification is essential to lower risk and accelerate system development. Therefore, comprehensive functional verification is key to reducing development costs and delivering a product on time. Functional verification of a design is most often performed using logic simulation and/or prototyping on field-programmable gate arrays (FPGAs).

ASIC prototyping using FPGAs consists of implementing a portion or the totality of an ASIC design into one or more FPGAs in order to validate its functionality. This operation is particularly effective for testing features that are unable to be verified using simulation. One way to overcome some of these limitations is to create a low-cost prototype of the entire ASIC under development, or some subsystems of the ASIC, and exercise its functionalities before entering the manufacturing process. Using commercially available FPGA-based platforms, it is possible to create such prototypes.

Multiple ASICs utilize emulation platforms to great lengths to verify the logic within the chip, but along the way a few notable weaknesses have appeared. Reprogramming an issue was difficult. The emulation platform uses a real-world environment that causes random events. This means that the same error event might not be seen for days or even weeks. Input-output (I/O) chips in general require a long runtime, typically over 8 hours, to verify the integrity of the chip. Getting trace or advanced event triggering (AET) events was very limited. Every new signal that needed to be added required a rebuild of the FPGAs and a reproduction of the issue, which could take days to reproduce.

Embodiments of the present invention provide a solution by capturing all inputs into a design under test and storing the inputs in a memory. During testing, the design under test will receive inputs and generate the corresponding output. At the same time, a copy of all input signals are stored in the memory, optionally in a compressed format. When an event occurs, for example, an error or a start of packet, the testing of the design under test will stop. The contents of the memory are then accessed and a user via a user interface can step through the operations in the memory that caused the event in the original design under test to debug the problem.

The present invention will now be described in detail with reference to the Figures.

Figure 1:
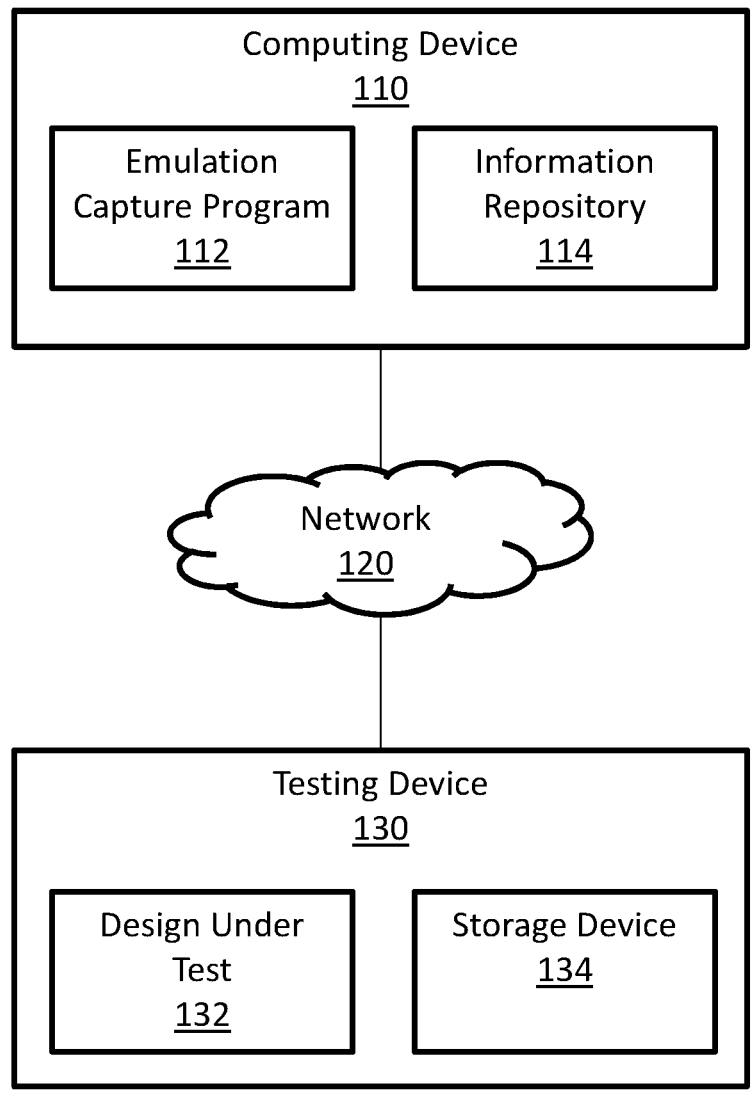
FIG. 1 is a functional block diagram illustrating a data processing environment in accordance with an embodiment of the present invention.

FIG. 1 is a functional block diagram illustrating a distributed data processing environment, generally designated 100, suitable for operation of emulation capture program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and testing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes emulation capture program 112. In an embodiment, emulation capture program 112 is a program, application, or subprogram of a larger program for capturing state in an emulation latch. In an alternative embodiment, emulation capture program 112 may be located on any other device accessible by computing device 110 via network 120. Emulation capture program 112 is described in more detail with reference to FIG. 3.

In an embodiment, computing device 110 includes information repository 114. In an embodiment, information repository 114 may be managed by emulation capture program 112. In an alternate embodiment, information repository 114 may be managed by the operating system of the device, alone, or together with, emulation capture program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, user data, event data, FPGA configuration data, delayed buffer storage data, data associated with the normal test program, other data that is received by emulation capture program 112 from one or more sources, and data that is created by emulation capture program 112. In an embodiment, information repository 114 includes trace data for the external interfaces of design under test 132. For example, the trace data may include Peripheral Component Interconnect Express (PCIe) trace data that are sent to, and received from, design under test 132.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Distributed data processing environment 100 includes testing device 130. Testing device 130 includes design under test 132, and storage device 134. The testing device 130 and its components are described in more detail with reference to FIG. 2.

Figure 2:
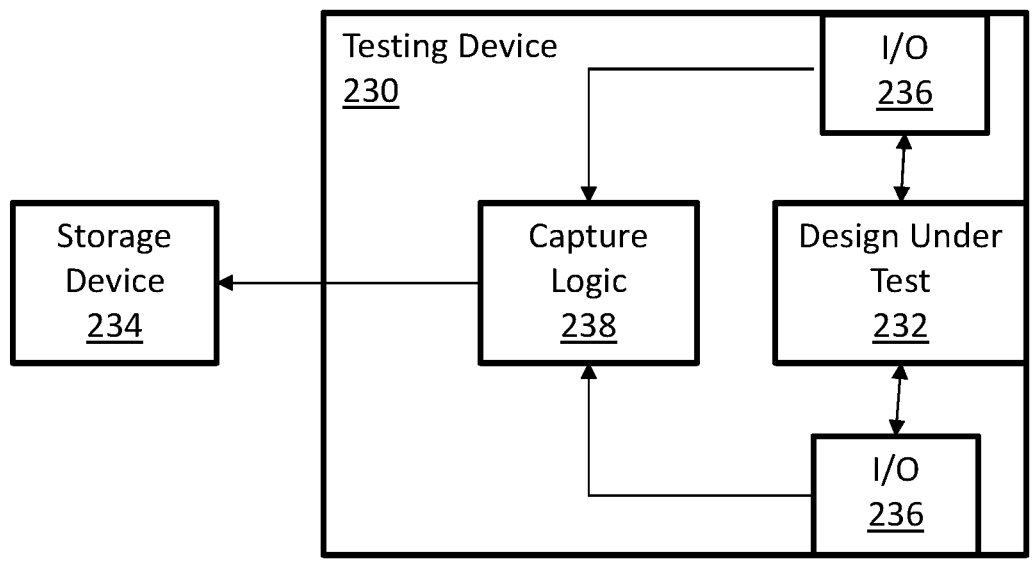
FIG. 2 is a block diagram of a testing device in accordance with an embodiment of the present invention.

FIG. 2 is an example of an embodiment of testing device 230 that includes a design under test 232. In an embodiment, design under test 208 is implemented in one or more FPGA devices. In another embodiment, design under test 208 is implemented in discrete hardware. In yet another embodiment, design under test 208 is implemented as a software simulation of the ASIC RTL code, e.g., Verilog or Very High Speed Integrated Circuit-Hardware Description Language (VHDL).

The testing device 230 also includes multiple input/output (I/O) ports 236. In an embodiment, the I/O ports are configured to receive hardware signals or instructions received by testing device 230 from a computing device. In one embodiment, the I/O ports 236 include a PCIE endpoint and a PCIE root that are configured to communicate with an operating system and a periphery device, respectively. In exemplary embodiments, all of the signals that are received by the I/O ports 236 that are sent to the design under test 232 are also provided to capture logic 238, which stores the signals in the storage device 234. In exemplary embodiments, the capture logic 238 is configured to compress the signals received before storing them in the storage device 234. The capture logic 238 may also contain logic to prevent data to be sent to the storage device when a certain condition is met, such as an error code, a fix or dynamic timer, or other definable events.

In one embodiment, the storage device 234 is implemented in internal memory, such as FPGA block random-access memory (RAM). In another embodiment, such as the one shown in FIG. 2, storage device 234 is implemented in memory that is external to the testing device 230, e.g., double data rate (DDR) RAM. In yet another embodiment, storage device 234 is implemented in information repository 114 on computing device 110. Storage device 234 204 may be implemented using any form of memory as may be appropriate as would be recognized by a person of skill in the art.

In an embodiment, when an event is detected the testing of the design under test 232 stops and the capture logic 238 stops storing inputs to the storage device. The contents of the storage device 234 are transferred to computing device 110. In an embodiment, computing device 110 is configured to simulate the operation of the design under test 232 via a scan engine and a clock controller. In an embodiment, the scan engine allows computing device 110 to emulate the design under test 232 and perform a debugging operation. In an embodiment, the scan engine allows the user via a user interface on computing device 110 to read the state of design under test 232 at any point. In an embodiment, the clock controller allows the user via a user interface on computing device 110 to step through the execution of design under test 232 based on the captured input signal stored in the storage device 234. In an embodiment, the clock controller allows the user via a user interface on computing device 110 to single step the operation of design under test 232 by generating one clock pulse per command from computing device 110. In another embodiment, the clock controller can generate any number of clock pulses via commands from the user via a user interface on computing device 110.

In one embodiment, an event, which can be generated or received by the testing device 230, signals the occurrence of some event of interest to the user testing the design under test 232. In an embodiment, the event may be, for example, an error condition, a start of packet signal, or a packet header. In an embodiment, the receipt of the event will cause the testing device 230 to stop storing inputs from the I/O 236 in the storage device 234.

Figure 3:
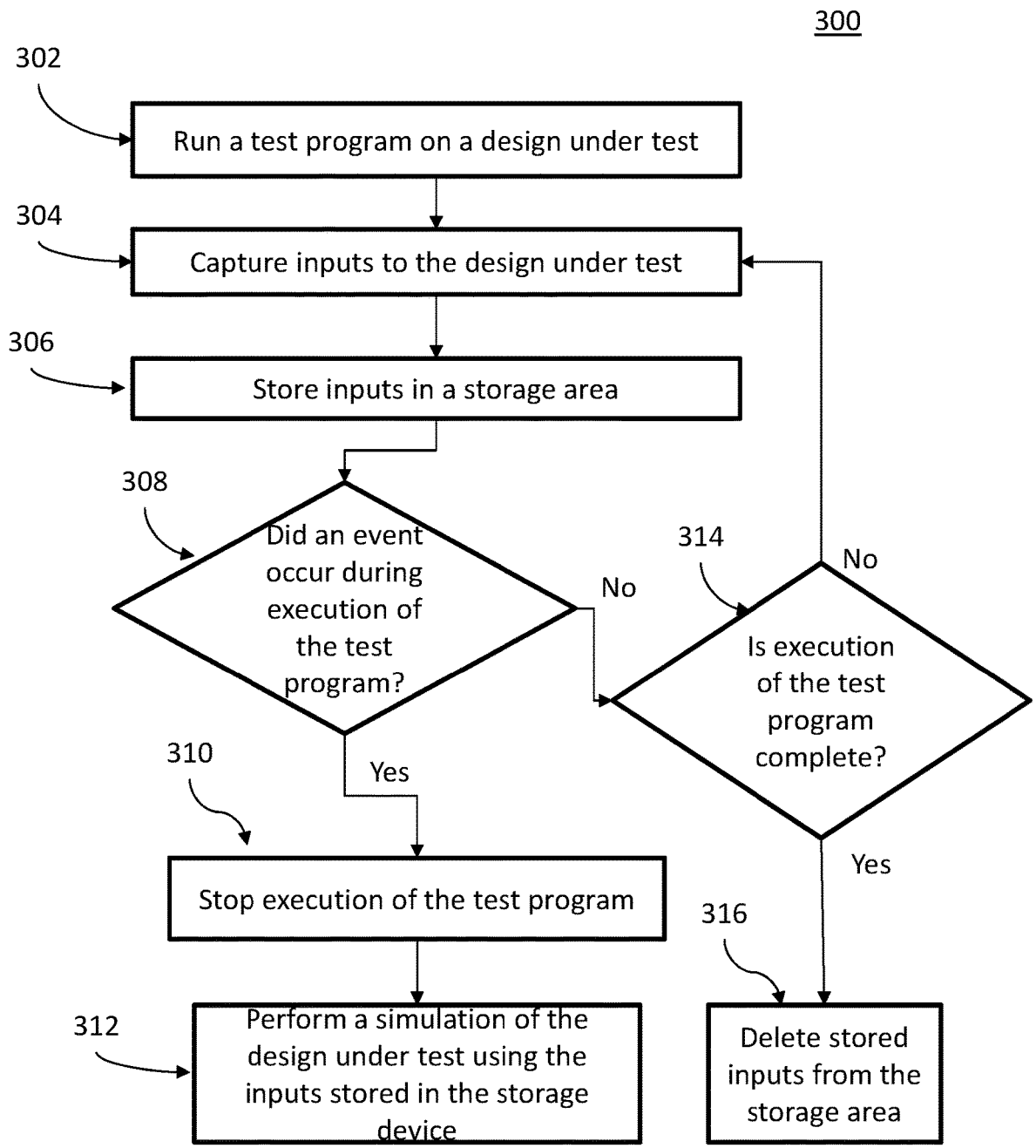
FIG. 3 is a flowchart of a method for simulating a design under test on an electronic device in accordance with an embodiment of the present invention.

Referring now to FIG. 3, a flowchart diagram of a method 300 for simulating a design under test on an electronic device in accordance with at least one embodiment of the invention is shown. In exemplary embodiments, the electronic device is an application-specific integrated circuit. The method 300 begins at block 302 by running a test program on the design under test. Next, as shown at block 304, the method 300 includes capturing inputs into the design under test. The method 300 further includes storing the inputs into the design under test in a storage device, as shown at block 306. In one embodiment, the storage device is disposed on the application-specific integrated circuit. In another embodiment, the storage device is not disposed on the application-specific integrated circuit, but it is in communication with the application-specific integrated circuit.

As shown at decision block 308, the method 300 includes determining whether an event occurred during the execution of the test program. In exemplary embodiments, the event may be a hardware event or a software event. For example, the event may be an error condition, a start of packet signal, or a packet header. In an embodiment, the event is an error condition generated by the design under test. The error condition may be, for example, an output signal from the design under test. In another example, an event occurs when a specific combination of output signals, or pattern of output signals, is detected from the design under test. In another embodiment, an event is triggered when a particular memory location in the design under test becomes a particular value. For example, when a particular memory location in the design under test is written with the value 088H, generate an event. In an embodiment, the event is an event detected from hardware, for example, a start of packet indication on a connected network. In yet another embodiment, the event can be any appropriate signal that aids in the testing and debugging of the design under test.

Based on determining that an event has occurred during the execution of the test program, the method 300 proceeds to block 310 and stops the execution of the test program on the design under test. Next, as shown at block 312, the method 300 includes performing a simulation of the design under test using the inputs stored in the storage device. Based on determining that an event has not occurred during the execution of the test program, the method 300 proceeds to decision block 314 and determines if the execution of the test program is complete. Based on determining that the execution of the test program is complete, the method 300 proceeds to block 316 and deletes the stored inputs from the storage area.

It should be appreciated that FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Figure 4:
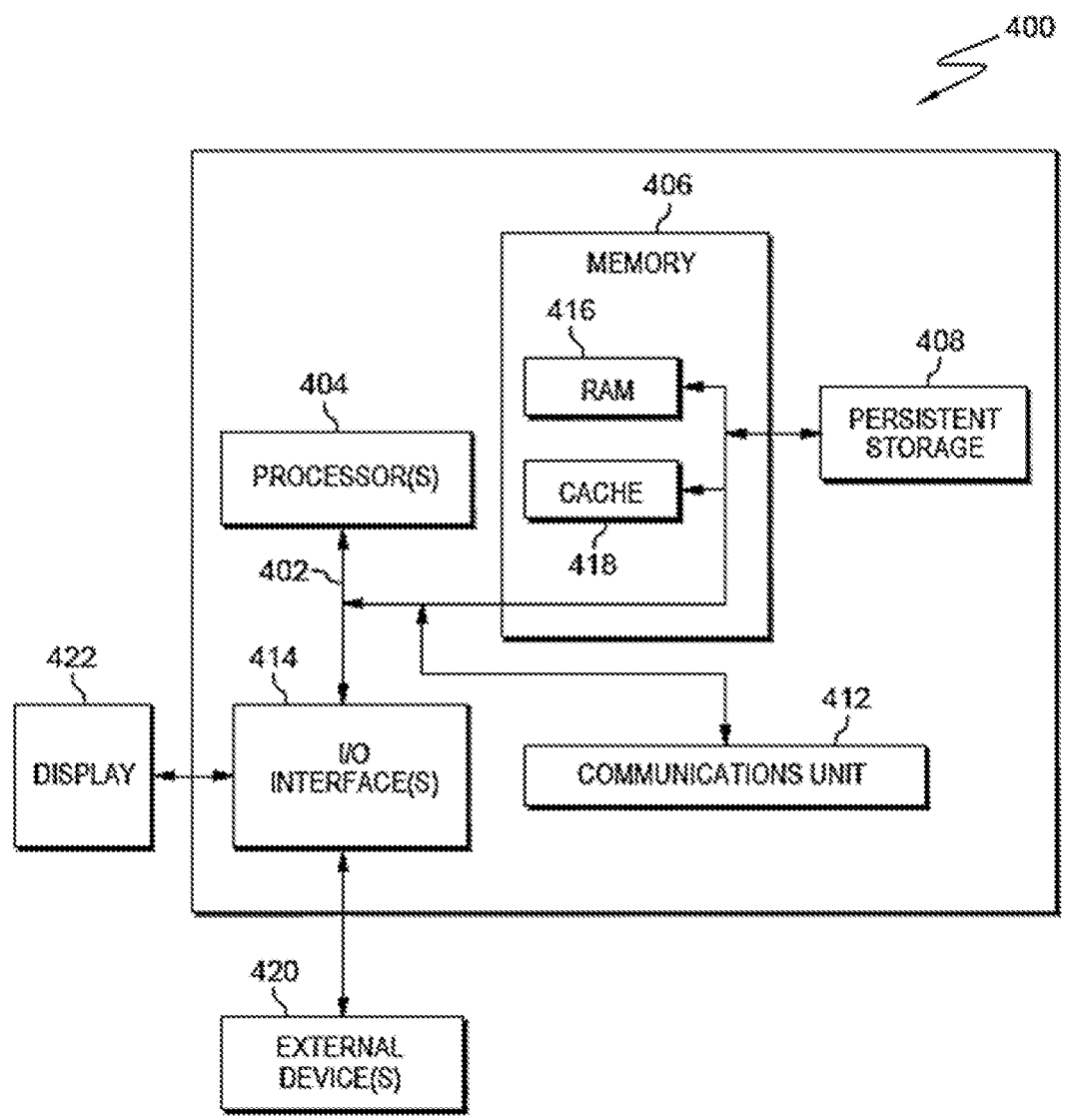
FIG. 4 depicts a block diagram of components of computing devices executing the method for simulating a design under test on an electronic device in accordance with an embodiment of the present invention.

FIG. 4 is a block diagram depicting components of computing device 110 suitable for emulation capture program 112, in accordance with at least one embodiment of the invention. FIG. 4 displays computer 400, one or more processor(s) 404 (including one or more computer processors), communications fabric 402, memory 406 including, RAM 416, and cache 418, persistent storage 408, communications unit 412, I/O interfaces 414, display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, computer 400 operates over communications fabric 402, which provides communications between the computer processor(s) 404, memory 406, persistent storage 408, communications unit 412, and input/output (I/O) interface(s) 414. Communications fabric 402 may be implemented with an architecture suitable for passing data or control information between processors 404 (e.g., microprocessors, communications processors, and network processors), memory 406, external devices 420, and any other hardware components within a system. For example, communications fabric 402 may be implemented with one or more buses.

Memory 406 and persistent storage 408 are computer readable storage media. In the depicted embodiment, memory 406 comprises RAM 416 and cache 418. In general, memory 406 can include any suitable volatile or non-volatile computer readable storage media. Cache 418 is a fast memory that enhances the performance of processor(s) 404 by holding recently accessed data, and near recently accessed data, from RAM 416.

Program instructions for emulation capture program 112 may be stored in persistent storage 408, or more generally, any computer readable storage media, for execution by one or more of the respective computer processors 404 via one or more memories of memory 406. Persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. In the context of some embodiments of the present invention, the source of the various input data may be physically remote to computer 400 such that the input data may be received, and the output similarly transmitted via communications unit 412.

I/O interface(s) 414 allows for input and output of data with other devices that may be connected to computer 400. For example, I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., emulation capture program 112, can be stored on such portable computer readable storage media and can be loaded onto persistent storage 408 via I/O interface(s) 414. I/O interface(s) 414 also connect to a display 422.

Display 422 provides a mechanism to display data to a user via the user interface and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGA, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for simulating a design under test on an electronic device, the computer-implemented method comprising:
    running, by one or more computer processors, a test program on the design under test;
    capturing inputs into the design under test;
    storing the inputs into the design under test in a storage device;
    determining, by the design under test, that an error has occurred during execution of the test program and transmitting an indication of the error;
    halting, by the one or more computer processors, the test program on the design under test based on the notification; and
    enabling, by the one or more computer processors, a user via a user interface to determine a cause of the error by performing a simulation of the design under test using the inputs stored in the storage device.

2. The computer-implemented method of claim 1, wherein the electronic device is an application-specific integrated circuit.

3. The computer-implemented method of claim 2, wherein the storage device is disposed on the application-specific integrated circuit.

4. The computer-implemented method of claim 2, wherein the storage device is in communication with the application-specific integrated circuit.

5. The computer-implemented method of claim 1, wherein the test program is a normal application for the device under test.

6. The computer-implemented method of claim 1, wherein the error is a hardware error.

7. The computer-implemented method of claim 1, wherein the error is a software error.

8. A computer program product for simulating an electronic device, the computer program product comprising one or more computer readable storage media and program instructions stored on the one or more computer readable storage media, the program instructions including instructions to:
    run a test program on the design under test;
    capture inputs into the design under test;
    store the inputs into the design under test in a storage device;
    determining, by the design under test, that an error has occurred during execution of the test program and transmitting an indication of the error;
    halt the test program on the design under test based on the notification; and
    enable a user via a user interface to determine a cause of the error by performing a simulation of the design under test using the inputs stored in the storage device.

9. The computer program product of claim 8, wherein the electronic device is an application-specific integrated circuit.

10. The computer program product of claim 9, wherein the storage device is disposed on the application-specific integrated circuit.

11. The computer program product of claim 9, wherein the storage device is in communication with the application-specific integrated circuit.

12. The computer program product of claim 8, wherein the test program is a normal application for the device under test.

13. The computer program product of claim 8, wherein the error is a hardware error.

14. The computer program product of claim 8, wherein the error is a software error.

15. A computer system for simulating an electronic device, the computer system comprising:
    one or more computer processors;
    one or more computer readable storage media; and
    program instructions stored on the one or more computer readable storage media for execution by at least one of the one or more computer processors, the stored program instructions including instructions to:
    run a test program on the design under test;
    capture inputs into the design under test;
    store the inputs into the design under test in a storage device;
    determining, by the design under test, that an error has occurred during execution of the test program and transmitting an indication of the error;
    halt the test program on the design under test based on the notification; and
    enable a user via a user interface to determine a cause of the error by performing a simulation of the design under test using the inputs stored in the storage device.

16. The computer system of claim 15, wherein the electronic device is an application-specific integrated circuit.

17. The computer system of claim 16, wherein the storage device is disposed on the application-specific integrated circuit.

18. The computer system of claim 16, wherein the storage device is in communication with the application-specific integrated circuit.

19. The computer system of claim 15, wherein the test program is a normal application for the device under test.

20. The computer system of claim 15, wherein the error is a hardware error.

* * * * *